United States Patent [19]

Hansen et al.

[11] 4,377,214
[45] Mar. 22, 1983

[54] METHOD AND APPARATUS FOR INTERFACING AN ELECTRONIC SCALE SYSTEM WITH A STORAGE MEDIUM

[75] Inventors: Gary G. Hansen, Greenwich; Gary D. Cholakian, Norwalk, both of Conn.

[73] Assignee: Pitney Bowes, Inc., Stamford, Conn.

[21] Appl. No.: 233,256

[22] Filed: Feb. 10, 1981

[51] Int. Cl.³ .............................................. G01G 19/40
[52] U.S. Cl. ....................................... 177/25; 364/466
[58] Field of Search ................... 177/25, 3, 4, DIG. 3; 364/466, 567

[56] References Cited

U.S. PATENT DOCUMENTS

| | | | |
|---|---|---|---|
| 3,170,624 | 12/1965 | Allen | 177/3 X |
| 4,115,870 | 9/1978 | Lowell | 364/401 X |
| 4,271,470 | 6/1981 | Dlogos | 364/466 |

*Primary Examiner*—Joseph W. Hartary
*Attorney, Agent, or Firm*—Peter Vrahotes; Albert Scribner; William Soltow, Jr.

[57] ABSTRACT

An interface apparatus and method are described with which an electronic scale system is connected to a storage medium such as a disk or memory of a data processor and whereby scale transaction data related to the mailing of an article with an electronic scale can be automatically preserved as a unified record along with subsequently appended test information such as an invoice number or customer number. The interface has a programmable memory with which a normal operating mode is provided to enable an operator to conveniently and rapidly store scale transaction data and in response to displayed prompts enter data such as the number of an invoice accompanying the article being mailed. The test data is appended to the scale transaction data so that all of this data can be transmitted as a unified record to a storage medium. The interface is further provided with a supervisory mode with which special examination and service operations can be performed as these are needed for monitoring or corrective steps in case of errors. The interface displays plain language prompts to guide an operator through a normal RUN mode as well as facilitate supervisory and service technician monitoring and control. With an interface of the invention the unified record enables a rapid update of a customer account and shipping information.

17 Claims, 13 Drawing Figures

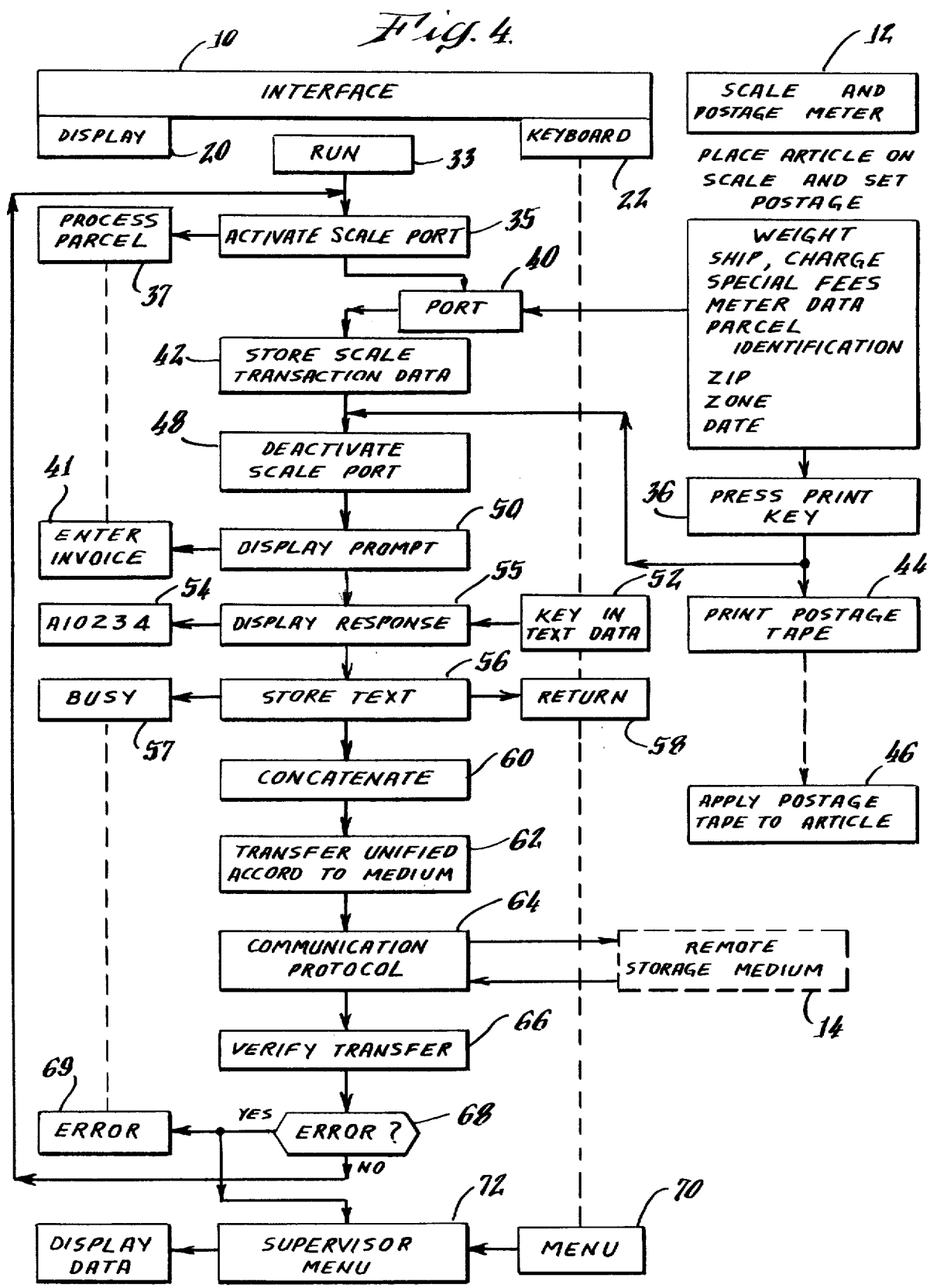

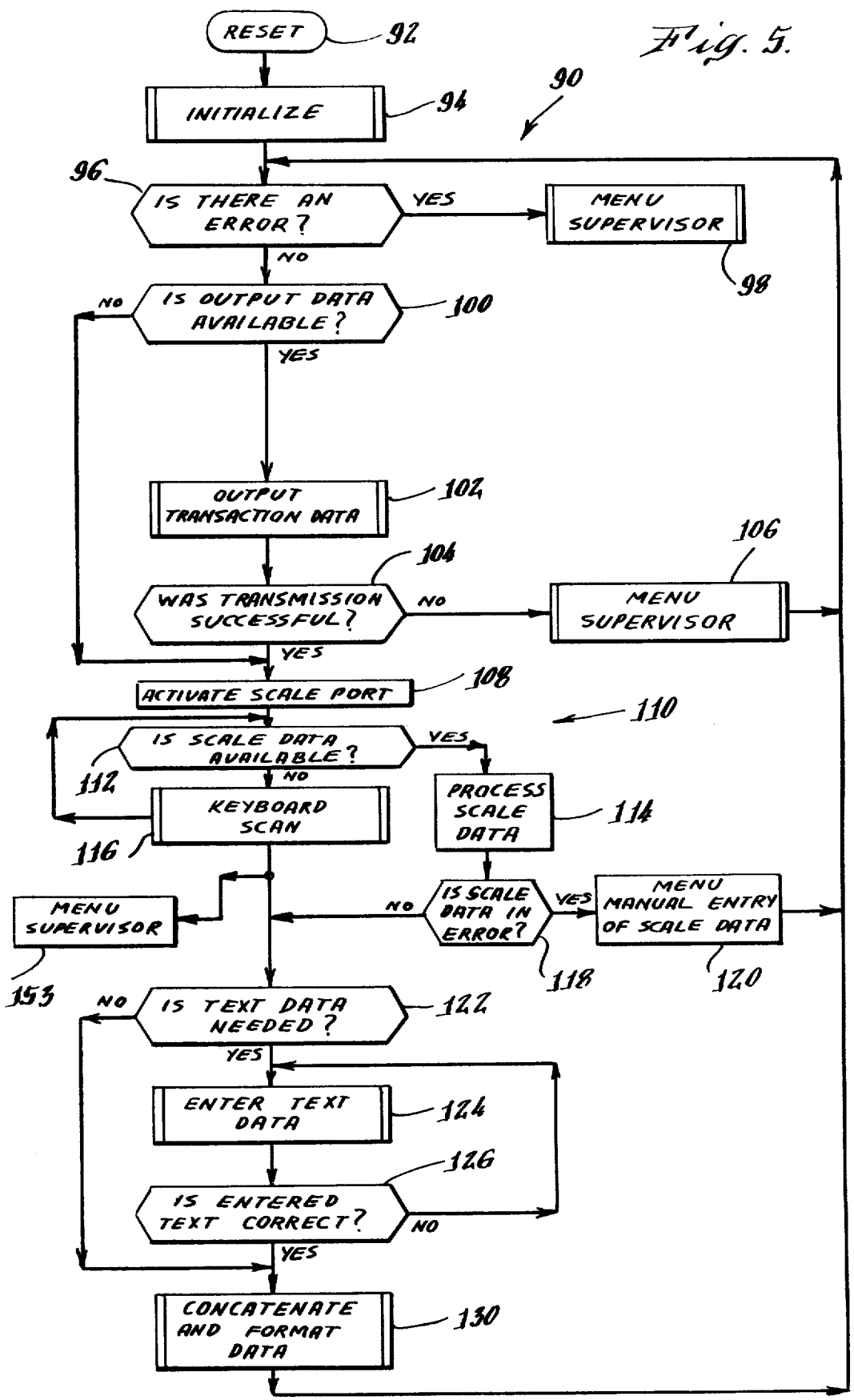

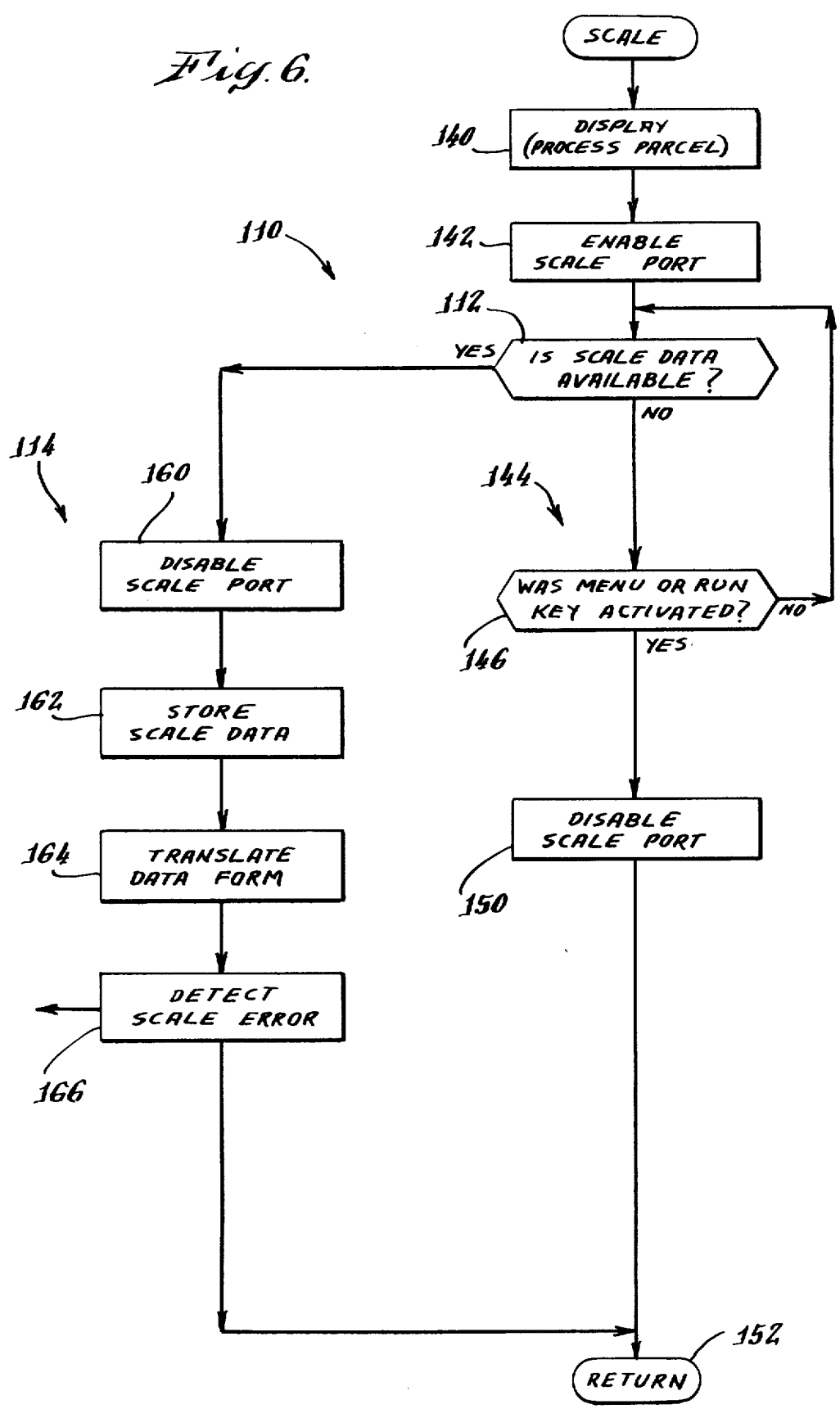

METHOD AND APPARATUS FOR INTERFACING AN ELECTRONIC SCALE SYSTEM WITH A STORAGE MEDIUM

FIELD OF THE INVENTION

This invention relates to a postage system generally and more specifically to a method and apparatus for communicating transaction data obtained from an electronic mail weighing and postage metering system with related account or customer data to a storage medium such as a data processor or diskette or the like.

BACKGROUND OF THE INVENTION

Electronic scale systems have been developed in which an article such as a parcel or letter is weighed and the correct postage computed in the light of the zip or zone destination, class, weight and other postage determining factors. In the case of the mailing of parcels, parcel identification numbers are employed and a shipping record is kept of the parcel with respect to that number to trace the parcel if it appears lost or fails to arrive at its intended destination.

In the mailing of parcels in response to customer orders, it is particularly desirable to link the final act of mailing with the customer such as its order, an invoice directed to the customer or similar customer related data and preserve postage and customer related information for purposes of billing or verification or other account keeping purposes as may appear desirable. One could, of course, keep a written record of the postage information, but this tends to be laborious, particularly when the information often needs to be entered subsequently with related customer or other record keeping activities in a data processor.

Techniques are known and have, therefore, been proposed to automatically interface with an electronic scale system so that scale transaction data can be preserved within the memory of a data processor. In one such known proposed system the electronic scale system is connectable through an interface equipment to a computer. The interface equipment has a microprocessor with a central processor unit, a programmable read only memory (PROM), a random access memory (RAM), a data bus and a peripheral input/output capability. The normally available scale transaction may then be entered into the computer. The known proposed interface equipment is adapted to communicate with a separate display/printer terminal or a computer to provide an immediate record of the postage transaction for the operator and has the ability to establish data communication through a standard format with a remotely located computer to store scale transaction data.

In another known proposed technique for processing scale transaction data from an electronic scale, the data is recorded on a floppy disc via an interface device. As part of such technique, it has been proposed to have a computer poll the interface to extract the recorded scale transaction data. In addition, it has been proposed to employ a special shipping label printer so that labels can be read by an electronic wand. The wand would then automatically read the order number and zip code from the label for automatic input to the interface without manual keyboard entry.

Still another known device proposes a postage accounting system with which scale transaction data from an electronic scale is stored by customer account number and accumulated in an interface. The interface can print out account numbers, total postal charges per account, and with the addition of special devices provide keyboard entry to add or subtract amounts from accounts as well as enable the transmission of data to a computer.

Although these known techniques for assembling and processing of scale transaction and keyboard data are useful in the processing and mailing of parcels, the normal mail room environment often requires more versatile and adaptable electronic scale information processing equipment to improve the processing of parcels and enable electronic verification of the shipment of goods to a customer when this is requested. In addition, for high speed processing and mailing, the personnel involved in the weighing of parcels, postage metering and record keeping must be aided with precise but simple and clear instructions from electronic support systems. If difficulties arise such as from erroneous scale transaction data, or improper customer data, corrections must be easily implemented.

SUMMARY OF THE INVENTION

In an article processing system in accordance with the invention, an interface is provided to accept scale transaction data and merge this with other related data such as from a keyboard or wand or other input devices to provide a unified record of the information generated during mailing of the article and related to a customer or client or such other account as may be kept. This data is automatically stored on a storage medium which may be the memory in a data processor or a separate memory such as a diskette.

In accordance with one form for an interface in accordance with the invention, the interface includes a programmable memory, a data memory, a central processor, and an alphanumeric display keyboard. The interface has signal ports enabling the interface to accept scale transaction data from an electronic scale as well as the keyboard and transmit a unified record to a remote storage medium. The interface is programmed to accept a predetermined maximum number of scale transactions so that, in case of data or power loss, little information is irretrievably lost. For example, as described for a preferred embodiment for an interface, data from a single scale transaction is processed at any one time by storing it in the interface and then disabling the scale port through which the data was entered until the stored data is successfully transferred to a storage medium.

With a scale to storage medium interface in accordance with the invention, an operator is guided through a normal running mode with appropriate displayed prompts on the interface display. For example, following receipt of scale transaction data in the interface an alphanumeric display automatically presents a prompt representative of a request for text information to be appended to the scale transaction data. The requested text information data may be, for example, a customer, client or account identification or invoice number. If such text information is required, the operator responds with an appropriate actuation of the keyboard and this is accumulated by the interface to be subsequently transmitted together with scale transaction data as a unified record to a storage medium.

As described herein, an interface is provided which may function at several modes representative of different levels of complexity. In a normal run mode, the operator is provided with plain, easily understood display instructions. When a difficulty is encountered, such as an error, a supervisor mode is entered by activating a special function key on the keyboard. This higher level supervisory mode permits a selection of various complex procedures by which appropriate corrective steps can be taken. For example, in case of an error in the transfer of scale transaction and text data to the remote storage medium, the supervisor mode permits a manual extraction of the data by causing the data to be sequentially displayed under control of the keyboard. Until such supervisory mode causes a return by the interface to its normal operation, new scale transaction data is prevented from entering the interface.

A more complex level of operation is provided with a diagnostic service mode. This is entered through the supervisory mode and requires a more highly trained technician to check the interface operations. Such diagnostic service mode provides display plain language prompts which tell the servicing technician the status of certain selectable parameters such as the band rate set for transmission to the remote storage medium, the status of certain routines and parts available as optional features and such other prompts as will facilitate conveying a clear overview of the interface to the service technician.

It is, therefore, an object of the invention to provide an improved method and apparatus for processing scale transaction data and text data related to a customer or account for use in the mailing of an article to produce a retrievable unified record related to the article and customer or account and provide shipping information. It is a further object of the invention to provide a method and apparatus with which, in the mailing of articles such as parcels, a prompt, convenient and efficiently generated unified record of the mailing and related account data can be formed by the mail operator while facilitating troubleshooting by a supervisor when difficulties arise.

These and other objects and advantages of the invention can be understood from the following description of one form of the invention in conjunction with the drawings.

BRIEF DESCRIPTION OF DRAWINGS

FIG. 1A is a sequence diagram of prompts displayed during a normal operating mode for an interface in accordance with the invention;

FIG. 4 is a schematic block diagram of sequential operating steps by an an interface in accordance with the invention;

FIG. 5 is a flow chart for an executive control program used in an interface as shown in FIGS. 1–4 to process scale transaction data and text data from a keyboard and transmit the information as a unified record to a storage medium;

FIG. 6 is a flow chart for a scale program routine used by an interface as shown in FIGS. 1–4 to store and process scale transaction data from a connected electronic scale system;

DETAILED DESCRIPTION OF DRAWINGS

Figure 1:
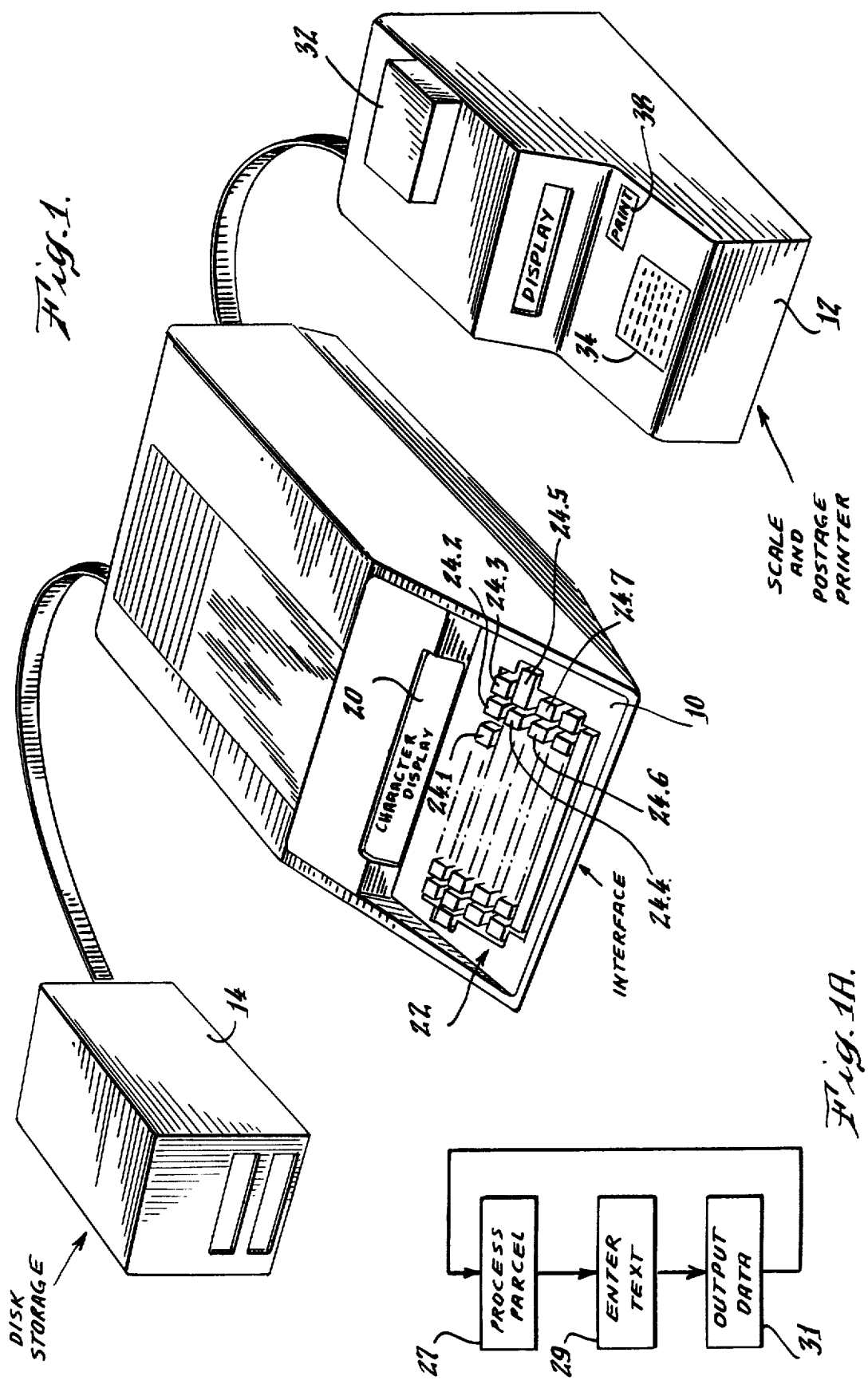
FIG. 1 is a perspective view of an interface in accordance with the invention for use with an electronic scale and remote storage medium on which a unified record is stored.

With reference to FIG. 1, an interface equipment 10 is shown coupled to an electronic scale and postage printing system 12 and a remote storage medium 14 such as a disk storage device. The storage medium 14, may be at a remote location or be a memory of a remotely located data processor. Both the storage of data on diskettes or in a memory of a remote data processor involve well known techniques. The scale and printer functions in system 12 may be provided by different devices, but for purposes of clarity are shown together. Both functions and devices are well known.

Figure 2:
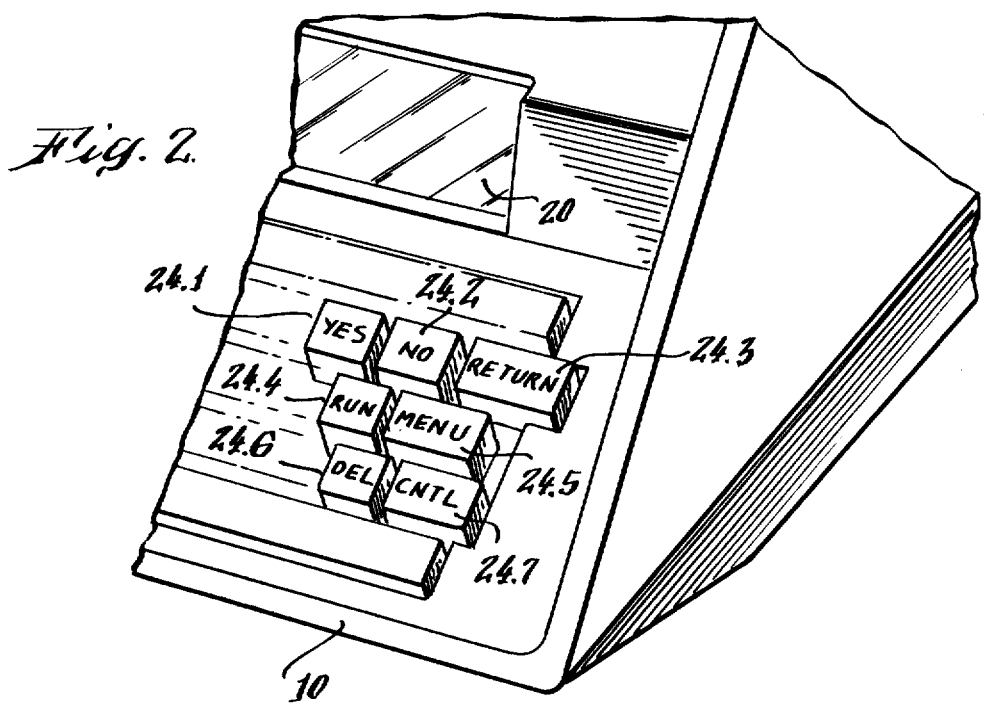
FIG. 2 is an enlarged perspective partial view of the interface of FIG. 1.
Figure 3:
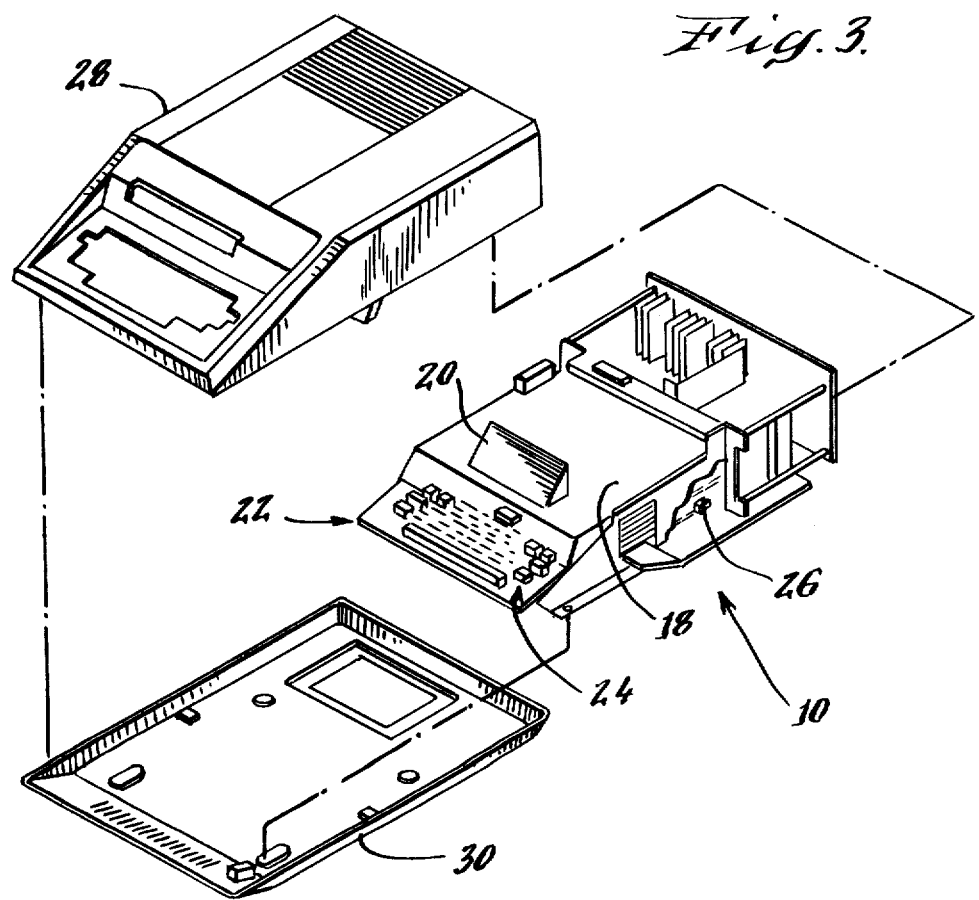
FIG. 3 is an exploded perspective view of an interface in accordance with the invention.

As shown in FIGS. 2 and 3 the interface 10 includes a microprocessor such as the Rockwell AIM-65 microcomputer board 18, carrying a programmable memory (PROM), a random access memory (RAM), an alphanumeric display 20 and alphanumeric keyboard 22. The keyboard 22 as shown in FIG. 1 is provided with special function keys 24.1-24.7. The location of the keys are shown grouped together for clarity, though different locations on keyboard 22 may be used. The display 20 and keyboard 22 are addressed through appropriate signal inputs and ports as are well known in the art.

In addition, interface 10 as illustrated in FIG. 3 includes devices on circuit boards 26 as are well known in the art for providing data communication through a port with an electronic scale and postage printing system such as 12 (see FIG. 1) along a plurality of parallel lines or along several serial data communication (RS232) channels which communicate with remote devices employing a known protocol and signal format. These channels are used in the embodiment of FIG. 1 to communicate through a storage medium port with remote storage medium 14. Cover 28 and a base 30 connect to retain the various electrical devices in interface 10.

With reference to FIGS. 1 and 1A, an article 32 which may be a parcel supplied from a conveyor belt (not shown) is placed on scale 12. This generates in a known manner scale transaction data such as weight, postage charges, parcel identification number, zip, zone and date. The scale transaction data may be produced in part through a numerical keyboard 34 associated with the scale system 12 or from internal devices in system 12 such as a zip to zone converter or date reader and the like, all of which are known devices.

When the interface 10 is in the normal operating RUN mode, the first prompt on display 20 is an instruction such as "PROCESS PARCEL" at 27 in FIG. 1A and means the weighing and postage metering with scale system 12 of an article 32 and automatic entry of scale transaction data into interface 10. This is automatically followed by an instruction at 29 with a display prompt such as "ENTER TEXT" or "ENTER INVOICE" or such other visually readable instruction which clearly depicts what type of information the operator must enter through the interface keyboard 22 to be appended to the previously entered scale transaction data. The interface 10 then automatically transfers all of the data related to the previously entered scale transaction data to a remote storage medium and while doing so, at 31, displays a prompt such as "SENDING DATA" or "SAVING DATA". The interface then automatically returns to the start of the operational RUN mode by displaying the prompt instruction "PROCESS PARCEL" at 27.

As shown in further detail in FIG. 4, the interface 10 is placed in a normal operating RUN mode by actuating at step 33 in FIG. 4 the RUN key 24.4 on keyboard 22. This enables interface 10 at 35 to cause a display of a prompt for the operator such as "PROCESS PARCEL" at 37 and thereupon activate the line or lines from scale system 12. When the operator, at 36, depresses the print key 38 of scale system 12 (see FIG. 1), data can pass through a scale port 40 into data memory storage at 42 of interface 10 while a postage tape is promptly generated at 44 in system 12 for attachment to parcel-article 32 (see FIG. 1) at 46.

Subsequent to storage of scale transaction data in the memory of interface 10, the latter is locked out at 48 (see FIG. 4) from receiving further data by deactivating the scale port 40 and a new prompt is automatically presented on display 20. As illustrated at 41, this may be the prompt "ENTER INVOICE" in response to which additional transaction related text information is to be entered through the keyboard 22.

The appendage of keyboard generated data to electronic scale transaction data conveniently permits a proper tagging of the latter data and upon storage in a signal processor memory maintain accounts current, permits prompt billing of customers and enables confirmation of the mailing of an article.

Accordingly, interface 10, in addition to its acceptance of scale transaction data in response to an instruction at the scale system 12, automatically generates at 50 a display instruction by which the prompt "ENTER INVOICE" is displayed at 41. The operator responds at 52 with a keyboard actuation, which is automatically displayed at 54 through a keyboard scan function at 55. For example, the invoice number A10234 is shown displayed at 54.

If the displayed invoice number is correct, the operator causes its storage at 56 by actuating a function keyboard key 24.3 (RETURN) at 58. Following the storage of this additional text data, it is concatenated with previously stored scale transaction data at 60 and transferred to a remote storage medium such as 14 at 62 using an appropriate well known communication protocol at 64. A verification of the transferred data is made at 66. During transfer of data to medium 14 a BUSY prompt is displayed at 57.

A check for error in the various interface operations is made at 68 and if no error was made, the interface is automatically returned to the operation step at 35.

In case of an error, the display 20 is activated at 69 and the prompt ERROR displayed. A supervisor may then make a more complex investigation of the reasons for the error by depressing a (MENU) function keyboard key 24.5 at 70. This results in a display of various interface functions and operations at 72 as will be further explained.

FIG. 5 illustrates an executive routine 90 for operating interface 10. The steps outlined in the routine 90 may be fixed into memory in the form of firm ware or variable as may be done with programmable microprocessors.

At step 92, such as at turn-on, a reset is carried out and followed by an initialization routine at 94 to establish values for various logic steps and display information such as prompts to enable normal operation. At step 96 a test is made for whether there is an error stored during one of the processing steps. Recognition of an error is made by storing along with the error an indication of the subroutine during which such error was made. Hence, the error test 96, if an error is found to be present, enables one to determine where the error occurred, such as in the interface 10, scale system 12, or disk storage medium 14. Also, the type of error, such as failure, not ready, communication problem, no response or invalid response is determined and stored. Visual and supervisory examination of these errors can be obtained by actuating the MENU key 24.8 at 98.

In the absence of an error, a test is made at 100 whether the output data such as scale transaction and text data is available from a previous electronic scale operation for transmission to a storage medium. If so, the data is transferred at 102 and the transfer verified at 104. In case of an incorrect transfer, the supervisor can trouble-shoot by actuating the MENU key 24.5 at 106.

The transfer of data is done by transmitting output data to a diskette in storage medium 14 with appropriate protocols and format as are currently known in the art. The techniques for verification of such data transfer also are known.

If the transfer of data was not successful as determined by the test at step 104, the output data may be manually extracted at step 106 by a supervisor with the aid of display 30 and a particular DISPLAY DATA function routine called up with the MENU key.

Once the data has either been transmitted to a storage medium or has been manually extracted, the executive routine 90 is prepared to accept new scale transaction data by enabling the scale port 40 at 108 and then entering a scale scanning routine 110. A first step 112 determines whether scale transaction data is available. A positive answer results in processing the data at step 114. However, if no scale data is available, control is returned to step 112 after scanning the keyboard at 116 for actuation of a function key 24.

When the test 112 is positive and scale data has entered interface 10, an error check of the scale data is carried out at 118 and if an error is found, the scale transaction data may be manually entered at 120 into interface 10 through keyboard 22 by actuating the supervisor mode with MENU key 24.8. The control is then returned to the start of the program at 96.

If scale transaction data has been stored, without error, in interface 10, an inquiry is made at 122 whether text data is needed. This test normally is positive so that text data can be entered from the keyboard and appended. However, if so desired, the test 120 can be set by the supervisor so as to bypass the entry of text data.

Normally text data is desired and a text data routine 124 is employed with the aid of keyboard 22, to enter appropriate information. Keyboard entries are displayed as they are entered. If the entered text data is in error as determined at step 126, return is made to step 124 with the display of a prompt such as ENTER TEXT or ENTER INVOICE.

With correct text data in memory in interface 10, the data is appended to scale transaction data at step 130 in a manner to form a concatenated string of data for transmission to a remote storage medium using the output routine commencing at step 96.

The executive routine 90 processes a single scale transaction at any one time thus preventing a loss of data from several transactions. If desired, a different number of scale transactions can be processed, though a single one is preferred.

FIG. 6 illustrates the scale routine 110 in greater detail. An electronic scale system 14 as shown in FIG. 1 produces an enabling signal for example when print key 32 (see FIG. 1) is actuated as an indication that scale transaction data is available. At 140 the display 30 provides an indication that an article is being processed, such as "PROCESS PARCEL". At 142 the scale port 40 is enabled to allow scale transaction data to be stored in interface 10.

After displaying "PROCESS PARCEL", the scale routine 110 alternately checks in a scan routine 144 whether the scale port has scale transaction data and if not, whether the special function MENU key 24.5 was actuated. Thus, if the test at 112 indicates that no scale transaction data is available, a test is made at 146 whether the MENU key 24.5 (see FIG. 2) has been actuated in keyboard 22. If not, a return is made to test 112 to continue the scanning cycle.

When the MENU key 24.5 is actuated, the scale port 40 is disabled at 150 and a return is made at 152 to the executive routine 90 in FIG. 3 and a supervisory mode at 153 is entered.

When scale data has been found available by test 112, the scale port 40 is disabled at 160 by generating an appropriate busy signal (not shown) to the electronic scale system 12. The scale transaction data is processed in routine 114 in which the data is stored in memory at 162 and transferred at 164 to a desired format. This transformation is selected such that scale transaction data can be transmitted and stored in a remote storage medium such as diskette 14 or data processor 22 using standardized well known character codes. At 166 the transformed scale transaction data is checked for errors. A return is then made to the executive routine 90 in FIG. 3 at 122 for the entry of text data.

Figure 7A:
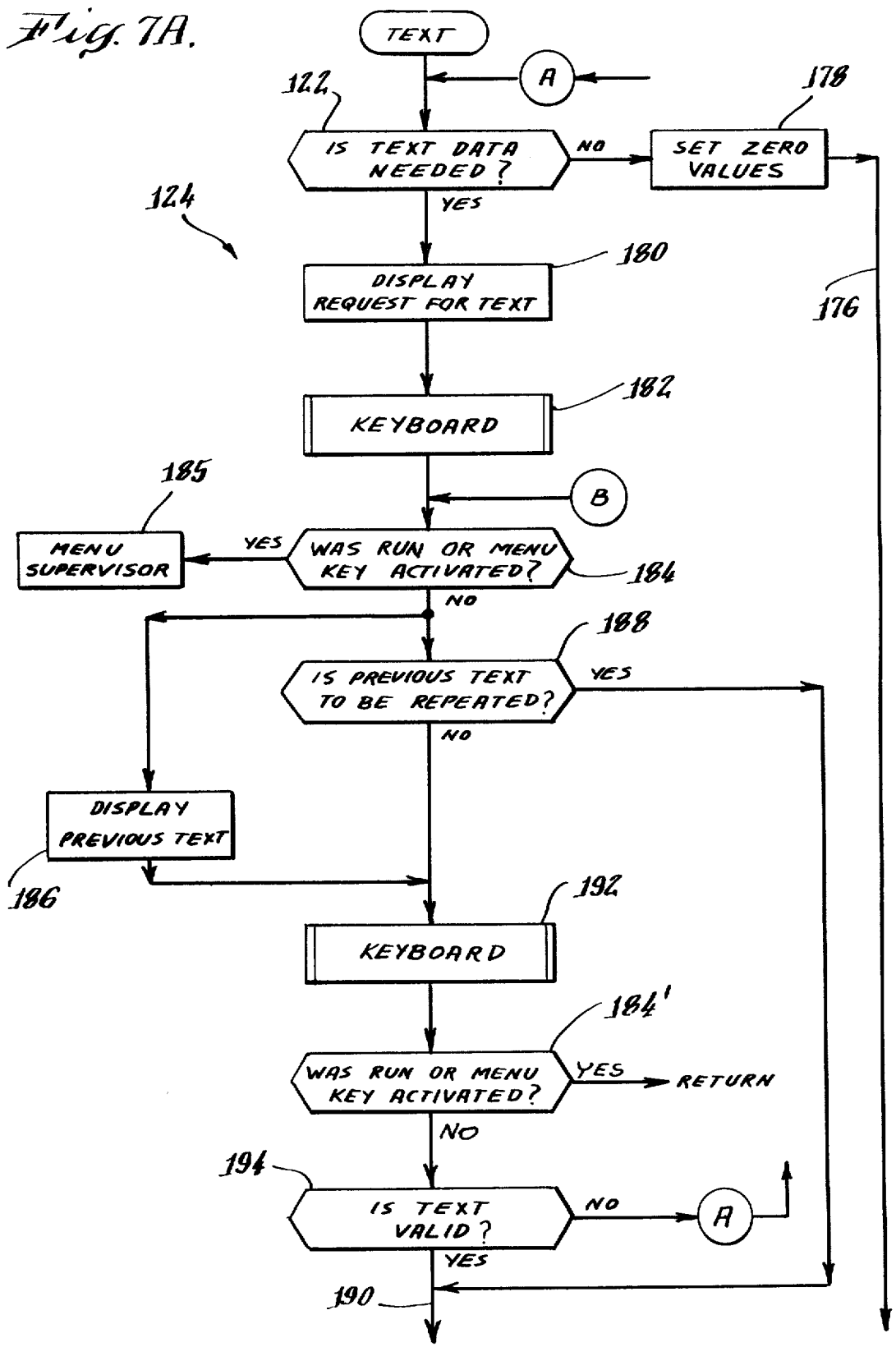
FIGS. 7A and 7B are flow charts which represent, in combination, a text routine used in an interface as shown in FIGS. 1–4 for appendage to scale transaction data of information such as customer and invoice identification data.
Figure 7B:
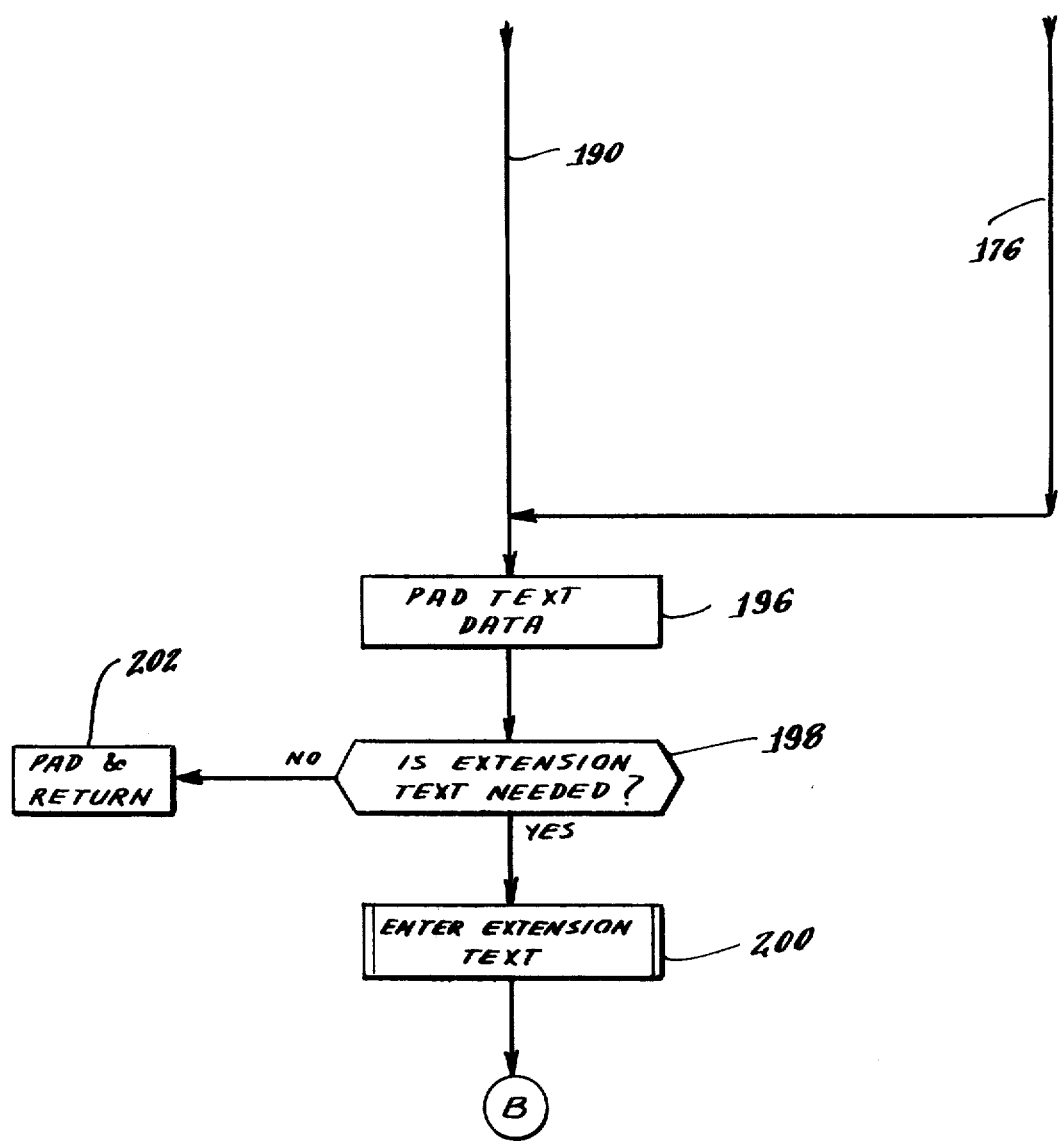

FIGS. 7A and 7B show details of a subroutine 124 to enter text data such as an invoice number from the keyboard 22. The test 122 is first made whether this routine should be bypassed depending upon an initial input value. If the test is negative, control is passed to an advanced step in the routine as shown by line 176 after setting of appropriate zero text values at 178.

When text data is desired, a display prompt is presented in plane language at 180 such as "ENTER INVOICE NUMBER". The keyboard 22 is actuated at 182. The keyboard actuation at 182 in FIG. 7A may represent an escape command, such as the actuation of the MENU function key 24.5 (see FIG. 2). This results in termination of the text routine 124 at 184 and a return to the MENU supervisory mode at 185.

When, in response to a request for text data, an affirmative keyboard entry is made at 182 by activating the RETURN function key 24.3 (see FIG. 2), a display of the previously entered text or invoice is made at 186 and a test is made at 188 whether the previous text or invoice number is to be appended to scale transaction data. Such repeat is likely to arise when several parcels are to be shipped to the same customer or must be charged to the same account. In such case the keyboard is affirmatively actuated with the RETURN function key 24.3 and further steps in routine 124 are executed starting at line 190 in FIGS. 7A and 7B.

When new text data is to be entered, the keyboard is actuated at 192 by depressing the appropriate keys in keyboard 22. The keyboard entries are displayed and if an error is made the operator can delete the last displayed character by depressing DEL or delete function key 24.6 (see FIG. 2). If the entire line needs to be deleted, the operator depresses both the CNTL function key 24.7 and the X letter key at the same time. Once the full text or invoice data is displayed, it is entered into memory by depressing the RETURN function key 24.3 (see FIG. 2).

The keyboard entry made at step 192 in FIG. 7A is checked at 194 for errors by employing a character check routine employing a conventional character algorithm check. If improper, such as too many characters, a return is made at A in routine 124 to repeat the text entry mode. After entry of valid text data, control is advanced to 196 in FIG. 7B where text data is padded out with appropriate nulls to a fixed character length in data memory.

At step 198 a test is made whether an extension of text data is required. Such extension may be found useful to add additional customer related information such as account number, address or the like. The extension text data is of similar length as the first text data. If extension data is required, an entry routine 200 which is similar to the previously described text routine is employed to form an extension character string. In the event no extension text data is needed, a return is made at 202 with the portion in data memory allocated for the extension data being padded out with predetermined characters such as all zeroes.

A particular advantage of interface 10 is its inclusion of a monitoring routine by which prompt corrective measures can be taken if trouble or errors occur and supervisory modes can be conveniently implemented. FIG. 8 shows the various supervisory routines which can be called up by depressing the MENU function key 24.5 in FIG. 2. The monitoring routine 210 is FIG. 8 is formed of distinct subroutines whose availabilities are first offered with display prompts in the form of questions and implemented or rejected depending upon whether the YES or NO function keys 24.1, 24.2 are then depressed. Hence, actuation of the YES function key 24.1 invokes the MENU display function, and the NO function key 24.2 causes a display of the next item or routine on the MENU monitor mode. Actuation of the MENU function key 24.5 causes a return to the top of the MENU mode, while actuation of the RUN function key 24.4 causes a return to the normal operating mode at the place where it was originally interrupted to commence the menu monitor mode.

Thus, commencing at 212.1, the first prompt displayed is "CONVERT DISKS", which represents a subroutine employed to transform data stored on a disk in disk storage medium 14 to a different format. A keyboard scan routine 214.1 is thereupon entered to determine whether and which function key 24 is activated. At 216.1 a test is made whether the RUN function key 24.4 or MENU function key 24.5 was depressed. In case of the former key, the MENU monitoring routine is aborted and control returned to the executive routine portion used to scan the scale system 12.

With a MENU function key actuation, a test is made at 218.1 whether the "CONVERT DISKS" routine is to be entered depending upon whether the YES or NO function keys 24 were depressed. A positive answer causes a storage of a flag or indication at 220.1 as to where in the monitor routine 210 a return is to be made after the CONVERT DISKS subroutine 222.1 has been executed.

For purposes of the invention the particulars of the CONVERT DISKS routine 222.1 need not be disclosed. Suffice it to explain that the conversion of data on a disk provides a desired compatibility of the data format with a particular disk storage and playback device. Upon completion of this subroutine, a return is made to the next step 212.2 in the monitor routine 210.

Also, when the test 218.1 yields a negative output via actuation of the NO function key 24.2, the subroutine 222.1 is bypassed and the monitor program automatically advances to display the next prompt BUILD DISKS at 212.2 which serves to inquire whether the supervisor wishes to execute this subroutine. This routine serves to process data on a disk in a predetermined manner to erase and format disk data. The details of this routine need not be further disclosed.

The subsequent steps and tests in the monitoring program follow a similar pattern and for that reason have been given like numbers, but with different decimal notations. Hence, a supervisor may rapidly scan through the array of subroutines 222.1-7 by depressing the NO function key 24.2 and actuating the YES function key 24.1 when the desired monitoring subroutine 222 is reached for execution. Note that an escape from the monitoring routine 210 can be made at any time by depressing the RUN function key 24.4.

Figure 9:
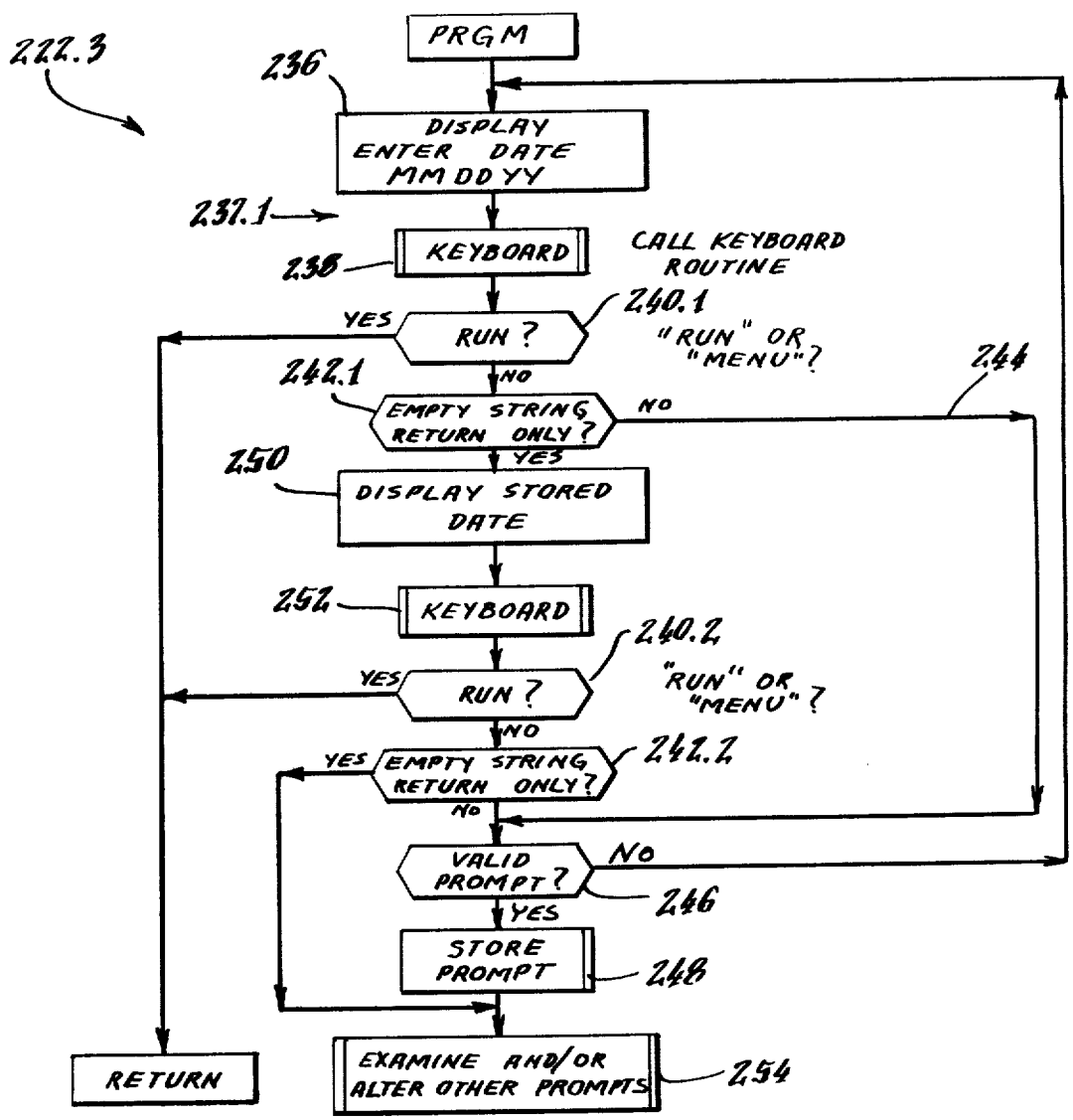
FIG. 9 is a flow chart for the examination and/or alteration of special prompts and updating of stored data.

The program subroutine 222.3 is employed to enable a supervisor to examine and/or change the date, or prompts employed to request text data during the normal RUN mode operation of interface 10. Thus, with reference to FIG. 9 the subroutine 222.3 is shown commencing with a subroutine with which the date stored in data memory can be updated from the keyboard 22.

At 236 the display 20 shows the prompt "ENTER DATE MMDDYY". Various keyboard responses may then be executed at 238. Actuation of the RETURN function key 24. causes an escape and exit with test 240.1. Depressing the MENU key causes a return to the top of the MENU monitor made at step 212.1 in FIG. 8A. When the keyboard is actuated at 238 to enter data characters followed by actuation of the RETURN function key 24.3, the test 242.1 causes an advance along line 244 to examine the validity of the new date at 246 and its storage at 248, if valid. An erroneous date entry causes a return to the start of the routine at 236.

When the keyboard at 238 is actuated only with the RETURN function key 24.3, the test 242 is positive and at 250 the currently stored date is displayed. At this time, if the operator wishes to change the displayed date, the keyboard is actuated at 252 followed by actuation of the RETURN function key 24.3, whereby the new date is stored at 248.

Alterations of prompts such as ENTER INVOICE or EXTENSION TEXT are made in a similar manner at 254. One may step through the various prompt alteration routines by solely actuating the RETURN function key 24.3 until the routine segment pertinent to the specific routine is encountered.

Figure 8A:
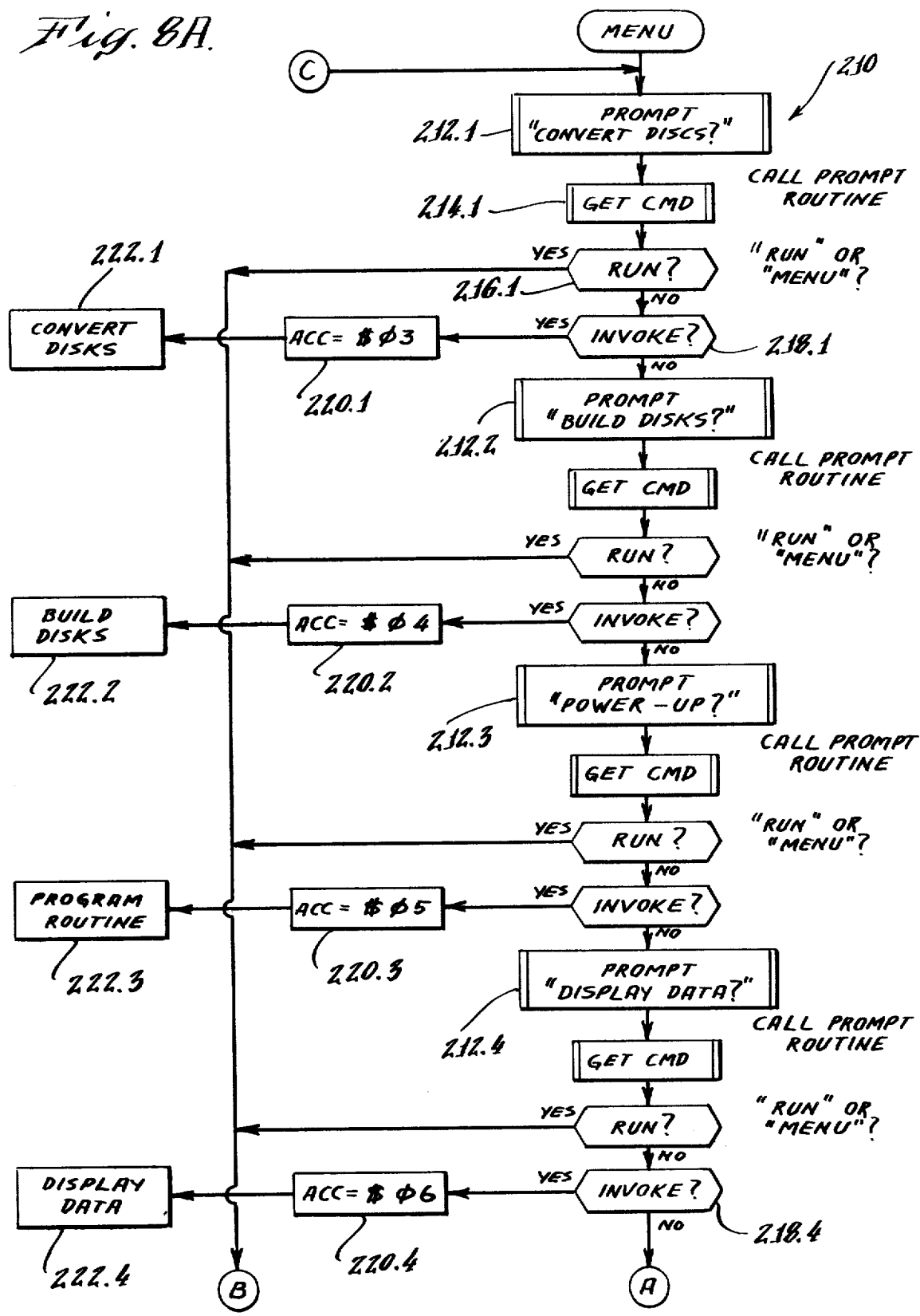
FIGS. 8A and 8B are flow charts which represents in combination a supervisory routine for invoking special techniques for controlling, correcting, and monitoring the interface and connected devices.
Figure 8B:
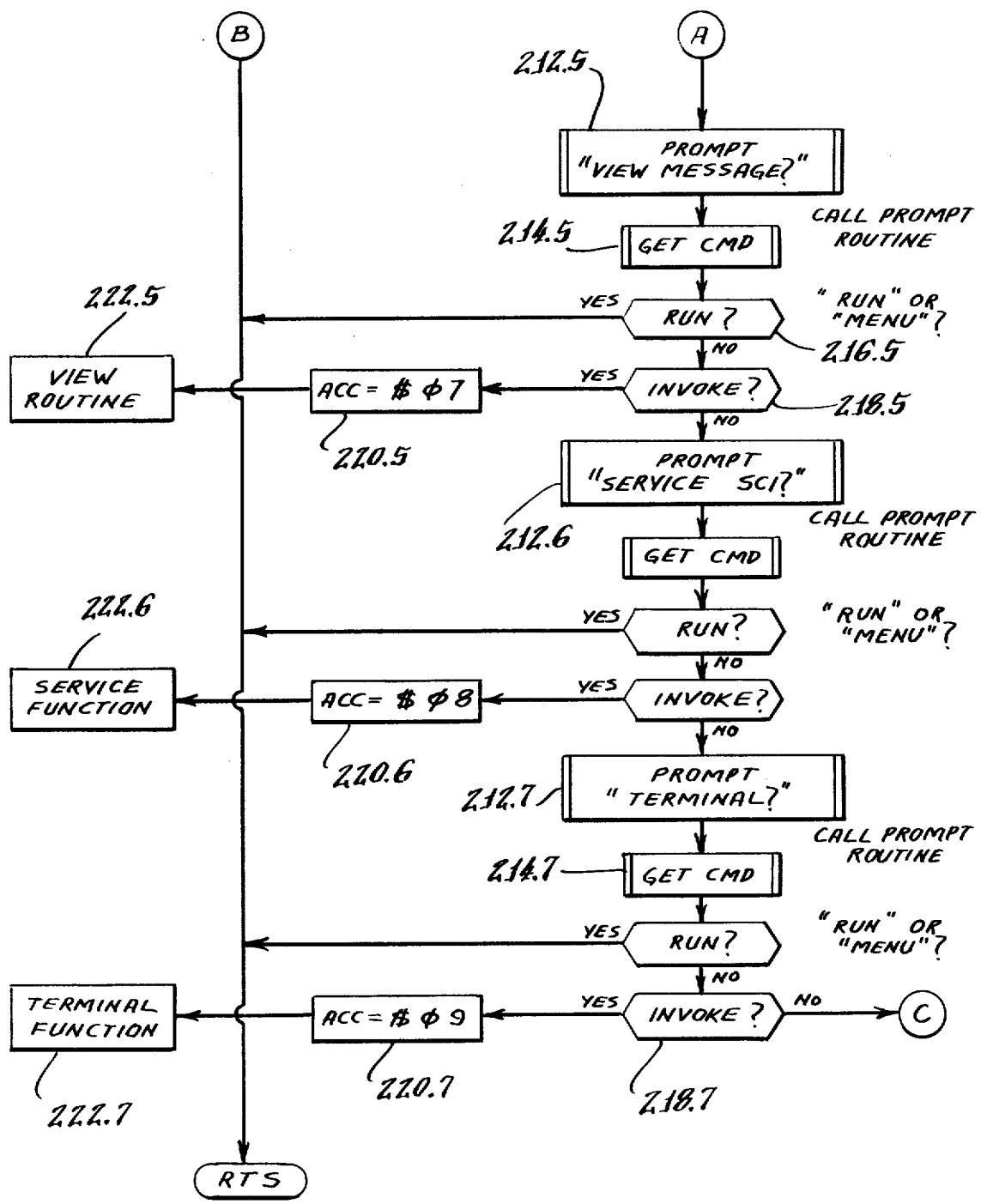
Figure 10:
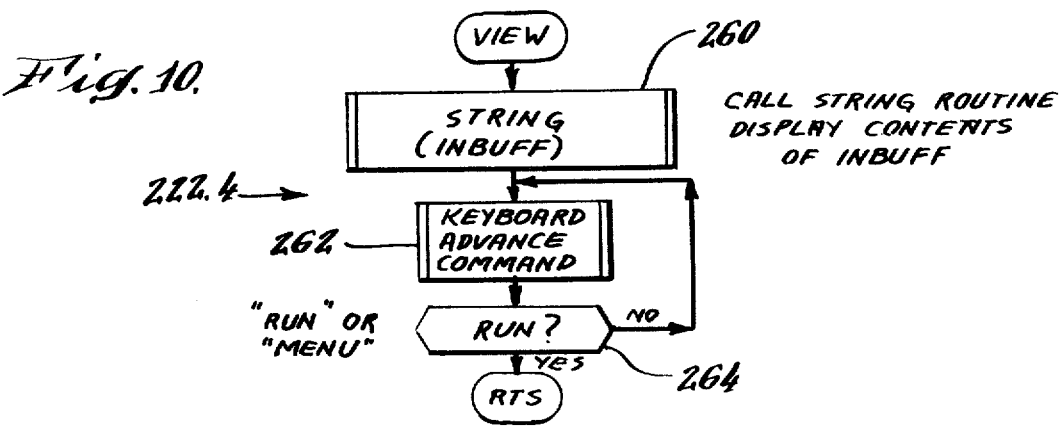
FIG. 10 is a flow chart for the display of scale transaction and text data.

When at times scale transaction and appended text data was not delivered to or stored in the remote storage medium or some other error with the transfer data has been detected the MENU supervisory routine 210, as shown in FIGS. 8A and 8B, permits manual copying of data with a subroutine invoked at 218.4. In this routine, all scale transactions and text data that were last entered are sequentially displayed under manual control of the keyboard RETURN function key 24.3. FIG. 10 shows the subroutine 222.4 in further detail and commences at 260 with a string routine by which each segment of data received from the scale system 12 is sequentially displayed under control at 262 by the RETURN function key 24.3 on keyboard 22 (see FIG. 2). A test is made at 264 whether an escape to normal RUN or MENU operation should be made or the next data segment displayed as requested by actuating the RETURN function key 24.3.

The view subroutine 222.5 of FIG. 8B serves to enable a supervisor or service technician to display messages received by interface 10 from the remote storage medium 140. The routine 222.5 enables trouble-shooting and system setup.

The service routine 222.6 includes various diagnostic tests for the interface 10. This routine permits testing of the output channel, memory and initial system setup with the scale system 12.

In the terminal routine at 222.7 on FIG. 8B, the interface 10 is transformed into a display terminal with which the supervisor or service technician can directly control the disk storage medium 14 or communicate with the remote computer.

Having thus described an interface in accordance with the invention for coupling an electronic scale system to a remotely located storage medium such as a diskette or the memory in a data processor, the advantages of the invention can be appreciated. The automatic features of the interface 10 may be conveniently expanded by incorporating an optical label reader. This may be a wand-type reader capable of detecting optical codes used on a parcel and thus providing interface 10 with specific addressee information to enable confirmation of parcel shipment and proper addressing.

What is claimed is:

1. An interfacing device for an article weighing and postage generating system having an electronic postage weighing scale operative to produce transaction data signals on an output comprising:

a manually actuatable alphanumeric keyboard, means for communicating with a storage medium so that scale transaction data signals and keyboard entered data signals can be preserved and processed, a programmable memory, a data memory, an electronically actuated display, and means for carrying out instructions stored in the programmable memory, said interface further having a scale port connected to receive scale transaction data signals, a display output to drive said display, a keyboard input to receive manually inserted response signals from said keyboard and a storage medium port connected to transmit scale transaction signals and keyboard originating text signals to the storage medium;

said manually actuatable keyboard being connected to the keyboard input, with said electronically actuated display being connected to the display output and being of sufficient length to visually indicate readable inquiry signals and response signals from the actuation of the keyboard;

means for storing scale transaction data signals in the data memory;

means responsive to the storing of said scale transaction data signals for producing a prompt on the display representative of a request for additional text data signals pertinent to the stored scale transaction data signals;

means for storing in said data memory keyboard text data signals responsive to said display request; and means for transmitting the scale transaction data and the keyboard text data signals from the storage medium port to said storage medium.

2. An apparatus as claimed in claim 1 wherein said scale to storage medium interface further includes:

means for sensing an error in the transmission of said scale transaction data and keyboard text data signals to said storage medium and producing an error signal indicative thereof; and means responsive to said error signal for preventing entry of subsequent scale transaction data signals into said interface.

3. An apparatus as claimed in claim 2 wherein said scale to storage medium interface further includes:

means responsive to the error signal for causing on said display a visual indication representative of said error signal; and means responsive to a keyboard entry signal for implementing a recovery of said interface from the error signal and enabling entry of subsequent scale transaction data signals into said interface.

4. An apparatus as claimed in claim 1 wherein said interface further includes:

means responsive to the storing of said scale transaction data signals for inhibiting entry of subsequent scale transaction data signals; and means responsive to said transmission error sensing means for enabling entry of subsequent scale transaction data signals when no error in said transmission is detected.

5. An apparatus as claimed in claim 1, 2, 3 or 4 wherein said means for storing said keyboard text data signals further includes:

means for generating a display signal representative of a request whether previously stored keyboard text data signals are to be appended to currently stored scale transaction data; and means responsive to a keyboard signal for appending said previously stored keyboard text data signals to the current scale transaction data signals.

6. An apparatus as claimed in claim 5 wherein said means for appending said previously stored keyboard text data signals further includes:

means for generating display signals representative of said previously stored keyboard text data signals;

means responsive to a keyboard originating signal representative of a confirmation response to the latter display signals for appending said previously stored keyboard text data signals to said scale transaction data signals.

7. An apparatus as claimed in claim 1, 2, 3 or 4 wherein said means for storing said keyboard text data signals further includes:

means for generating said keyboard text data signals in several distinct parts with each part being individually and selectively bypassed or generated.

8. An apparatus as claimed in claims 1, 2, 3 or 4 and further including:

means responsive to a predetermined keyboard actuation for producing a supervisory operating mode for the interface to investigate a normal operation mode thereof.

9. An apparatus as claimed in claim 8 wherein said means for producing a supervisory mode further comprises:

means for sequentially displaying respective scale transaction data.

10. An apparatus as claimed in claim 8 wherein said means for producing a supervisory mode further comprises:

means for sequentially examining and selectively altering said display prompt.

11. In a method for processing article postage information generated by an electronic scale which produces scale transaction data signals and with an interface apparatus which interconnects the electronic scale with a storage medium of a data processor or a diskette or the like, the improvement comprising the steps of:

storing data of a predetermined number of scale transactions from the scale in a memory located in the interface;

inhibiting, following the storing step, subsequent storing of scale transaction data in the interface;

displaying on a display associated with the interface a visually readable indication representative of a request for text data from the actuation of a keyboard associated with the interface and related to stored scale transaction data;

storing text data representative of said keyboard actuation with said stored scale transaction data; and transmitting the stored scale transaction data and stored text data representative of said keyboard actuation to said storage medium;

verifying the correct transmittal of said data; and enabling the receipt by said interface of subsequent scale transaction data following verification of said correct transmittal.

12. A method for processing article postage information generated by an electronic scale as claimed in claim 11 wherein said verifying step further includes the steps of:

detecting an error in the transmittal of said data and generating a visual indication of the detected error on the display;

invoking a supervisory opertional mode in response to a detected error to enable recovery from the detected error.

13. A method for processing article postage information as claimed in claim 12 wherein said invoking step further comprises:

extracting in response to the detection of an error in the transmittal of said data, said scale transaction data and said text data from said interface.

14. A method for processing article postage information as claimed in claim 12 and further including the steps of:

detecting the actuation of a predetermined key on said keyboard as a command instruction for establishing said supervisory mode; and actuating a monitor routine in response to said command instruction to establish said supervisory control.

15. A method for processing article postage information as claimed in claim 11 or 14 wherein said step of storing text data further comprises the step of:
   appending said text data to the stored scale transaction data to form a concatenated string of data for transmittal as a unified record to the storage medium.

16. A method for processing article postage information as claimed in claim 15 wherein said step of storing text data further comprises:
   displaying previously transmitted text data; and
   appending said previously transmitted text data to the current scale transaction data.

17. A method for processing article postage information as claimed in claim 15 wherein said step of storing text data further comprises:
   appending a first part of keyboard generated text data to said scale transaction data in response to a first keyboard generated signal;
   appending an extension part of keyboard generated text data to said first part in response to a second keyboard generated signal to form said concatenated string of data for transmittal to the storage medium.

* * * * *